United States Patent
Xu

(10) Patent No.: US 10,001,862 B2
(45) Date of Patent: Jun. 19, 2018

(54) SENSING PANEL AND MANUFACTURING METHOD OF THE SAME, METHOD FOR PRESSURE DETECTION AND TEMPERATURE DETECTION

(71) Applicant: SHENZHEN CHINA STAR OPTOELECTRONICS TECHNOLOGY CO., LTD., Shenzhen, Guangdong (CN)

(72) Inventor: Hongyuan Xu, Guangdong (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 0 days. days.

(21) Appl. No.: 14/773,246

(22) PCT Filed: Apr. 30, 2015

(86) PCT No.: PCT/CN2015/078062
§ 371 (c)(1),
(2) Date: Sep. 4, 2015

(87) PCT Pub. No.: WO2016/165167
PCT Pub. Date: Oct. 20, 2016

(65) Prior Publication Data
US 2018/0024682 A1    Jan. 25, 2018

(30) Foreign Application Priority Data
Apr. 13, 2015 (CN) .......... 2015 1 0170441

(51) Int. Cl.
*G06F 3/041* (2006.01)
*G01K 7/02* (2006.01)

(52) U.S. Cl.
CPC .......... *G06F 3/0414* (2013.01); *G01K 7/021* (2013.01)

(58) Field of Classification Search
CPC .......... G06F 3/044; G06F 3/042; G06F 3/041; G06F 3/0414; G02F 1/13338;
(Continued)

(56) References Cited

U.S. PATENT DOCUMENTS 5,610,629 A * 3/1997 Baur .................. G06F 3/0412
345/104
2006/0077186 A1* 4/2006 Park .................. G06F 3/0412
345/173

(Continued)

*Primary Examiner* — Hong Zhou
(74) *Attorney, Agent, or Firm* — Kirton McConkie; Evan R. Witt

(57) ABSTRACT

A sensing panel and a manufacturing method of the same, and a method for pressure detection and temperature detection are disclosed in the present invention. The sensing panel comprises a scanning line, a first data line, a second data line, a first detection line, a second detection line, a pressure detecting unit, and a temperature detecting unit. The pressure detecting device is used to detect a pressure applied to the pressure detecting unit; the temperature detecting device is used to detect a temperature an object either near the temperature detecting unit or in contact with the temperature detecting unit. The present invention is able to detect the pressure and the temperature applied to the sensing panel.

20 Claims, 8 Drawing Sheets

(58) Field of Classification Search
CPC . G05F 1/463; H01L 27/14692; H01L 27/323; H01L 27/3244; A61B 6/4233; A61B 2560/0468; A61B 2562/0247; A61B 2562/0271; A61B 2562/06; G01K 7/021
See application file for complete search history.

(56) References Cited

U.S. PATENT DOCUMENTS

| | | | |
|---|---|---|---|
| 2011/0050642 A1* | 3/2011 | Lee | G02F 1/167 345/175 |
| 2012/0321149 A1* | 12/2012 | Carver | G06K 9/0004 382/124 |
| 2013/0162587 A1* | 6/2013 | Chan | G06F 3/041 345/174 |
| 2014/0060210 A1* | 3/2014 | Jeon | H01L 29/84 73/862.68 |
| 2014/0247231 A1* | 9/2014 | Lin | G06F 3/0414 345/173 |
| 2014/0354905 A1* | 12/2014 | Kitchens | G06F 1/3215 349/12 |
| 2015/0071323 A1* | 3/2015 | Lee | G06K 9/0002 374/45 |

\* cited by examiner

SENSING PANEL AND MANUFACTURING METHOD OF THE SAME, METHOD FOR PRESSURE DETECTION AND TEMPERATURE DETECTION

BACKGROUND OF THE INVENTION

Field of Invention

The present invention relates to the field of sensing technology, and more particularly to a sensing panel and a manufacturing method of the same, and a method for pressure detection and temperature detection.

Description of Prior Art

A conventional touch sensing panel (ex: a touch sensing panel applied to a screen of a mobile phone) is integrated with a display screen for usage, the conventional touch sensing panel is used to detect a position where a touch-pressure is applied in the touch sensing panel.

The conventional touch sensing panel is unable to detect the strength of the touch-pressure and the temperature of a touch object which applies the touch-pressure.

Hence, a new technical proposal is needed to provide for solving the above technical issue.

SUMMARY OF THE INVENTION

An objective of the present invention is to provide a sensing panel and a manufacturing method of the same, and a method for pressure detection and temperature detection, which is able to accomplish a detection of touching pressure, and a detection of a temperature of a touching object.

To achieve the above objective, the present invention provides a technical proposal as below:

A sensing panel, the sensing panel comprises at least one scanning line; at least one data line combination, which comprises a first data line and a second data line; at least one signal-detection line combination, which comprises a first detection line and a second detection line; at least one detecting unit combination, wherein the detecting unit combination is connected with the scanning line, the data line combination, and the signal-detection line combination, the detecting unit combination comprises: a pressure detecting unit, which comprises a first thin film transistor switch and a pressure detecting device, the first thin film transistor switch is connected with the scanning line, the first data line, and the pressure detecting device, the pressure detecting device further is connected with the first detection line and the pressure detecting device is used to detect a pressure applied to the pressure detecting unit, to generate a pressure-detection signal; and a temperature detecting unit, which comprises a second thin film transistor switch and a temperature detecting device, the second thin film transistor switch is connected with the scanning line, the second data line, and the temperature detecting device, the temperature detecting device further is connected with the second detection line, the temperature detecting device is used to detect a temperature of an object either near the temperature detecting unit or in contact with the temperature detecting unit, to generate a temperature-detection signal; the sensing panel further comprises: a first calculating circuit, which is connected with the first detection line, the first calculating circuit is used to receive the pressure-detection signal and to calculate a strength of the pressure according to the pressure-detection signal; and a second calculating circuit, which is connected with the second detection line, the second calculating circuit is used to receive the temperature-detection signal and to calculate the temperature detected by the temperature detecting unit according to the temperature-detection signal; the first calculating circuit further calculates a position where the pressure is applied, according to the pressure-detection signal and a scanning signal transmitted from the scanning line, or the second calculating circuit further calculates a position where the object is located either near the temperature detecting unit or in contact with the temperature detecting unit, according to the temperature-detection signal and a scanning signal transmitted from the scanning line; adjacent two of the scanning lines transmitting the scanning signals at starting times that differ in a high level voltage duration.

In the sensing panel, the first thin film transistor switch comprises a first gate electrode, a first source electrode, and a first drain electrode. The first gate electrode connects with the scanning line, the first source electrode connects with the first data line, the first drain electrode connects with a terminal of the pressure sensing device, and another terminal of the pressure sensing device connects with the first detection line; the second thin film transistor switch comprises a second gate electrode, a second source electrode, and a second drain electrode, the second gate electrode connects with the scanning line, the second source electrode connects with the second data line, the second drain electrode connects with a terminal of the temperature sensing device, and another terminal of the temperature sensing device connects with the second detection line.

In the sensing panel, the sensing panel further comprises: a substrate, the scanning line is disposed on the substrate; a first insulation layer, disposed on the substrate, and the first insulation layer covers the scanning line; a semi-conductor layer, disposed on the first insulation layer; a source electrode layer, disposed on the first insulation layer and the semi-conductor layer; a drain electrode layer, disposed on the first insulation layer and the semi-conductor layer; a second insulation layer, disposed on the first insulation layer, the semi-conductor layer, the source electrode layer and the drain electrode layer; a first electrode layer, disposed on the second insulation layer, the first electrode layer is connected with the drain electrode layer through a via hole of the second insulation layer; a dielectric layer, disposed on the first electrode layer; and a second electrode layer, disposed on the dielectric layer.

In the sensing panel, in the pressure sensing unit, the dielectric layer comprises a rubber layer; in the temperature sensing unit, the dielectric layer comprises a thermal-sensitive metal layer.

In the sensing panel, the substrate is a plastic substrate, the first insulation layer is a first organic insulation layer, the semi-conductor layer is an organic semi-conductor layer, and the second insulation layer is a second organic insulation layer.

A sensing panel, the sensing panel comprises at least one scanning line; at least one data line combination, which comprises a first data line and a second data line; at least one signal-detection line combination, which comprises a first detection line and a second detection line; at least one detecting unit combination, wherein the detecting unit combination connects with the scanning line, the data line combination, and the signal-detection line combination, the detecting unit combination comprises: a pressure detecting unit, which comprises a first thin film transistor switch and a pressure detecting device, the first thin film transistor switch is connected with the scanning line, the first data line, and the pressure detecting device, the pressure detecting device further is connected with the first detection line and the pressure detecting device is used to detect a pressure applied to the pressure detecting unit, to generate a pressure-detection signal; and a temperature detecting unit, which comprises a second thin film transistor switch and a temperature detecting device, the second thin film transistor switch is connected with the scanning line, the second data line, and the temperature detecting device, the temperature detecting device further is connected with the second detection line, the temperature detecting device is used to detect a temperature near the temperature detecting unit or a temperature of an object in contact with the temperature detecting unit, to generate a temperature-detection signal.

In the sensing panel, the sensing panel further comprises: a first calculating circuit, which connects with the first detection line, the first calculating circuit is used to receive the pressure-detection signal and to calculate a strength of the pressure according to the pressure-detection signal; and a second calculating circuit, which connects with the second detection line, the second calculating circuit is used to receive the temperature-detection signal and to calculate the temperature detected by the temperature detecting unit according to the temperature-detection signal.

In the sensing panel, the first calculating circuit further calculates a position where the pressure is applied, according to the pressure-detection signal and a scanning signal transmitted from the scanning line, or the second calculating circuit further calculates a position where the object is located either near the temperature detecting unit or in contact with the temperature detecting unit, according to the temperature-detection signal and a scanning signal transmitted from the scanning line.

In the sensing panel, adjacent two of the scanning lines transmit the scanning signals at starting times that differ in a high level voltage duration.

In the sensing panel, the first thin film transistor switch comprises a first gate electrode, a first source electrode, and a first drain electrode. The first gate electrode connects with the scanning line, the first source electrode connects with the first data line, the first drain electrode connects with oa terminal of the pressure sensing device, and another terminal of the pressure sensing device connects with the first detection line; the second thin film transistor switch comprises a second gate electrode, a second source electrode, and a second drain electrode, the second gate electrode connects with the scanning line, the second source electrode connects with the second data line, the second drain electrode connects with a terminal of the temperature sensing device, and another terminal of the temperature sensing device connects with the second detection line.

In the sensing panel, the sensing panel further comprises: a substrate, the scanning line is disposed on the substrate; a first insulation layer, disposed on the substrate, and the first insulation layer covers the scanning line; a semi-conductor layer, disposed on the first insulation layer; a source electrode layer, disposed on the first insulation layer and the semi-conductor layer; a drain electrode layer, disposed on the first insulation layer and the semi-conductor layer; a second insulation layer, disposed on the first insulation layer, the semi-conductor layer, the source electrode layer, and the drain electrode layer; a first electrode layer, disposed on the second insulation layer, the first electrode layer is connected with the drain electrode layer through a via hole of the second insulation layer; a dielectric layer, disposed on the first electrode layer; and a second electrode layer, disposed on the dielectric layer.

In the sensing panel, in the pressure sensing unit, the dielectric layer comprises a rubber layer; in the temperature sensing unit, the dielectric layer comprises a thermal-sensitive metal layer.

In the sensing panel, the substrate is a plastic substrate, the first insulation layer is a first organic insulation layer, the semi-conductor layer is an organic semi-conductor layer, and the second insulation layer is a second organic insulation layer.

A manufacturing method of the sensing panel, the manufacturing method comprises: A. Disposing the scanning line, a first insulation layer, a semi-conductor layer, a source electrode layer, a drain electrode layer, and a second insulation layer on a substrate; B. Disposing a via hole in the second insulation layer; C. Disposing a first electrode layer on the second insulation layer, the first electrode layer is connected with the drain electrode layer through the via hole; D. Disposing a dielectric layer on the first electrode layer; E. Disposing a second electrode layer on the dielectric layer; F. Performing a patterning process on an integral part constituted by the first electrode layer, the dielectric layer, and the second electrode layer.

In the manufacturing method of the sensing panel, the dielectric layer comprises a rubber layer and a thermal-sensitive metal layer, the rubber layer is in the pressure sensing unit, the thermal-sensitive metal layer is in the temperature sensing unit; the step D further comprises following steps: d1. Disposing the rubber layer on a position where the pressure sensing unit corresponds in the first electrode layer; d2. Disposing the thermal-sensitive metal layer on a position where the temperature sensing unit corresponds in the first electrode layer; the step F further comprises following steps: f1. Performing a patterning process on an integral part constituted by the first electrode layer, the rubber layer, and the second electrode layer; f2. Performing a patterning process on an integral part constituted by the first electrode layer, the thermal-sensitive metal layer, and the second electrode layer.

A method for pressure detection and temperature detection of the sensing panel, the method comprises following steps of: G the pressure detecting unit detecting a pressure applied to the pressure detecting device, and generating a pressure-detection signal; H. the temperature detecting device detecting a temperature of an object either near the temperature detecting unit or in contact with the temperature detecting unit, and generating a temperature-detection signal; I. the first calculating circuit receiving the pressure-detection signal, and calculating a strength of the pressure according to the pressure-detection signal; J. the second calculating circuit receiving the temperature-detection signal, and calculating a temperature detected by the temperature detecting unit according to the temperature-detection signal.

In the method for pressure detection and temperature detection of the sensing panel, the method further comprises: K. the first calculating circuit calculating a position where the pressure is applied, according to the pressure-detection signal and a scanning signal transmitted from the scanning line; L. the second calculating circuit calculating a position where said object is located either near the temperature detecting unit or in contact with the temperature detecting unit, according to the temperature-detection signal and the scanning signal transmitted from the scanning line.

In the method for pressure detection and temperature detection of the sensing panel, adjacent two of the scanning lines transmits the scanning signals at starting times that differ in a high level voltage duration.

A manufacturing method of the sensing panel, the manufacturing method comprises: M. Disposing the scanning line, a first insulation layer, a semi-conductor layer, a source electrode layer, a drain electrode layer, and a second insulation layer on a substrate; N. Disposing a via hole in the second insulation layer; O. Spurting or evaporating a third metal layer on the second insulation layer, and patterning the third metal layer to form a first electrode layer; P. Coating a dielectric material on the first electrode layer, and patterning the dielectric material to form the dielectric layer; Q. Spurting or evaporating a fourth metal layer on the dielectric layer, and patterning the fourth metal layer to form a second electrode layer.

In the manufacturing method of the sensing panel, the dielectric layer comprises a rubber layer and a thermal-sensitive metal layer, the rubber layer is in the pressure sensing unit, the thermal-sensitive metal layer is in the temperature sensing unit; the step P further comprises following steps: p1. Disposing the rubber layer on a position where the pressure sensing unit corresponds in the first electrode layer; p2. Disposing the thermal-sensitive metal layer on a position where the temperature sensing unit corresponds in the first electrode layer.

With respect with the conventional art, the present invention is able to accomplish a detection of a pressure applied to the sensing panel and a detection of a temperature of an object either near the sensing panel or in contact with the sensing panel.

In order to make the above description be easily understood, below are embodiments with accompany drawings and a detailed explanation.

DETAILED DESCRIPTION OF THE PREFERRED EMBODIMENTS

As used in this specification the term "embodiment" means an instance, example, or illustration. In addition, the articles "a" or "an" as used in this specification and the appended claims in general can be interpreted as "one or more" unless specified otherwise or clear from context to be directed towards the singular form.

A sensing panel of the present invention is able to be applied in a display field. For example, the sensing panel of the present invention is able to integrate with a display panel, to detect strength, a temperature, a position, of a touch and so on. Also, the sensing panel of the present invention is able be applied in other fields which need to detect a strength, a temperature, a position, of a touch and so on. For example, the sensing panel of the present invention is able to be used as electric skin for the robotics field and so forth.

Figure 1:
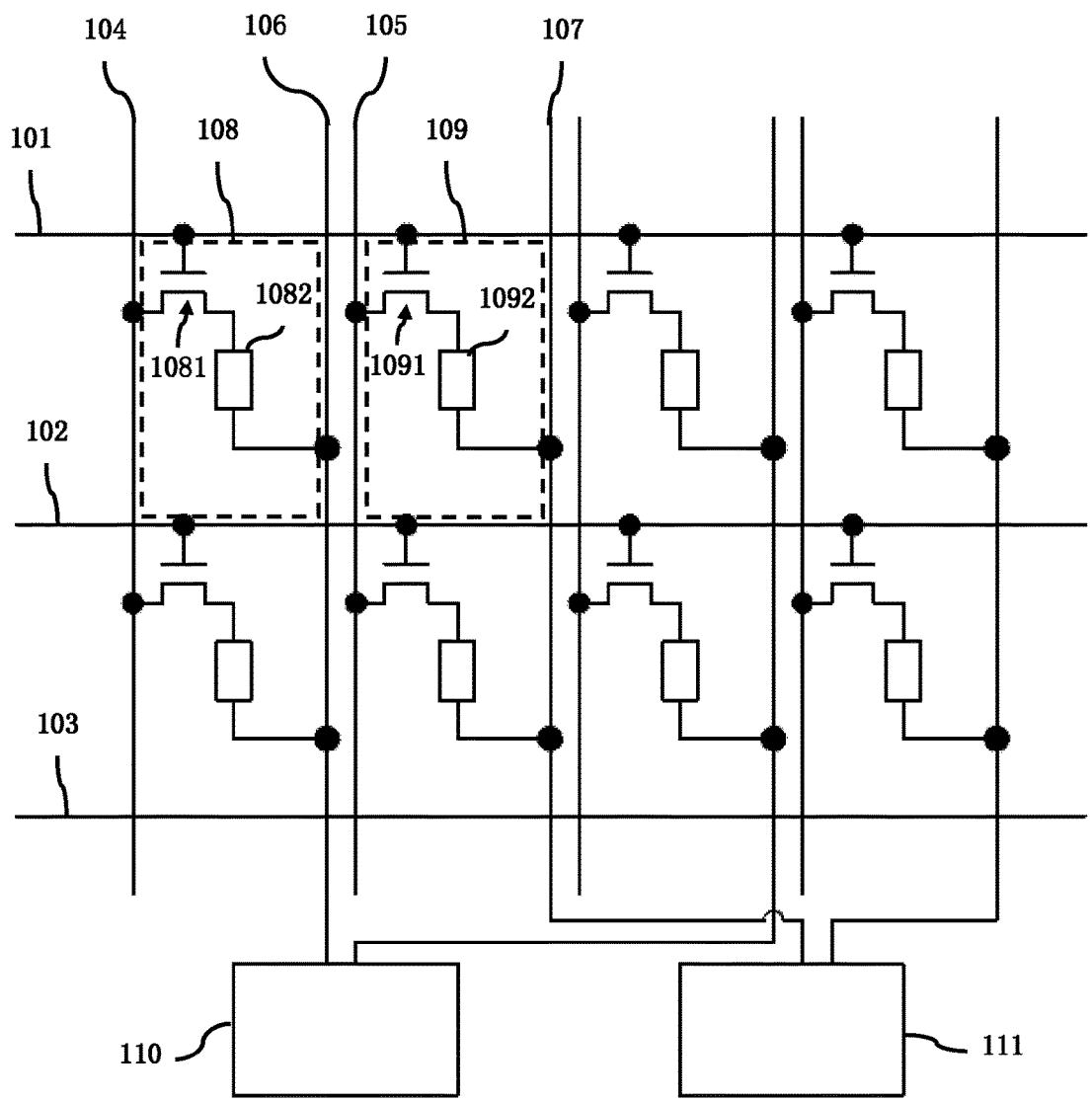
FIG. 1 is a circuit diagram of a first embodiment of the sensing panel according to the present invention.

FIG. 1 is a circuit diagram of a first embodiment of the sensing panel according to the present invention.

A sensing panel of the embodiment comprises at least one scanning line (101, 102, 103), at least one data line combination (104, 105), at least one signal-detection line combination (106, 107), at least one detecting unit combination (108, 109), a first calculating circuit 110, and a second calculating circuit 111.

The at least one data line combination (104, 105) comprises a first data line 104 and a second data line 105. The at least one signal-detection line combination (106, 107) comprises a first detection line 104 and a second detection line 105. The at least one detecting unit combination (108, 109) connects with the scanning line 101, the data line combination (104, 105), and the signal-detection line combination (106, 107). The detecting unit combination (108, 109) comprises a pressure detecting unit 108 and a temperature detecting unit 109. The pressure detecting unit 108 comprises a first thin film transistor switch 1081 and a pressure detecting device 1082. The first thin film transistor switch 1081 connects with the scanning line 101, the first data line 104, and the pressure detecting device 1082. The pressure detecting device 1082 further connects with the first detection line 106, the pressure detecting device 1082 is used to detect a pressure applied to the pressure detecting unit 108, so as to generate a pressure-detection signal; the temperature detecting unit 109 comprises a second thin film transistor switch 1091 and a temperature detecting device 1092. The second thin film transistor switch 1091 connects with the scanning line 101, the second data line 105, and the temperature detecting device 1092. The temperature detecting device 1092 further connects with the second detection line 107. The temperature detecting device 1092 is used to detect a temperature of an object either near the temperature detecting unit 109 or in contact with the temperature detecting unit 109, so as to generate a temperature-detection signal.

The scanning line 101 is used to provide a scanning signal G1, the scanning signal G1 is used to control turn on/off of the first thin film transistor switch 1081 and the second thin film transistor switch 1091. The data lines are used to provide data signals, the data signals make the pressure sensing device 1082 to generate the pressure-detection signal under the pressure effect, and make the temperature sensing device 1092 to generate the temperature-detection signal under the temperature/heat effect.

The first calculating circuit 110 connects with the first detection line 106. The first calculating circuit 110 is used to receive the pressure-detection signal and calculate strength of the pressure, according to the pressure-detection signal. The second calculating circuit 111 connects with the second detection line 107. The second calculating circuit 111 is used to receive the temperature-detection signal and calculate a temperature detected by the temperature detecting unit 109, according to the temperature-detection signal.

In the embodiment, the first thin film transistor switch 1081 comprises a first gate electrode, a first source electrode, and a first drain electrode. The first gate electrode connects with the scanning line 101, the first source electrode connects with the first data line 104, the first drain electrode connects with a terminal of the pressure sensing device 1082, another terminal of the pressure sensing device 1082 connects with the first detection line 106. The first thin film transistor switch 1081 receives the scanning signal G1 of the scanning line 101 by the first gate electrode, and turns on/off a first current channel between the first source electrode and the first drain electrode according to the scanning signal G1.

The second thin film transistor switch 1091 comprises a second gate electrode, a second source electrode, and a second drain electrode. The second gate electrode connects with the scanning line 101, the second source electrode connects with the second data line 105, the second drain electrode connects with a terminal of the pressure sensing device 1092, and another terminal of the pressure sensing device 1092 connects with the second detection line 107. The second thin film transistor switch 1091 receives the scanning signal G1 of the scanning line 101 by the second gate electrode, and turns on/off a second current channel between the second source electrode and the second drain electrode according to the scanning signal G1.

Figure 2:
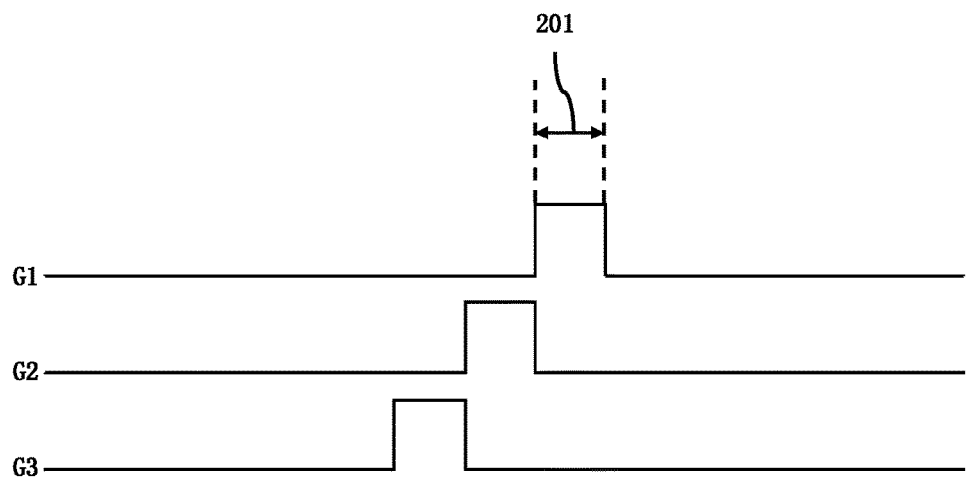
FIG. 2 is an oscillogram of the scanning signal transmitted from the scanning line of FIG. 1.
Figure 3:
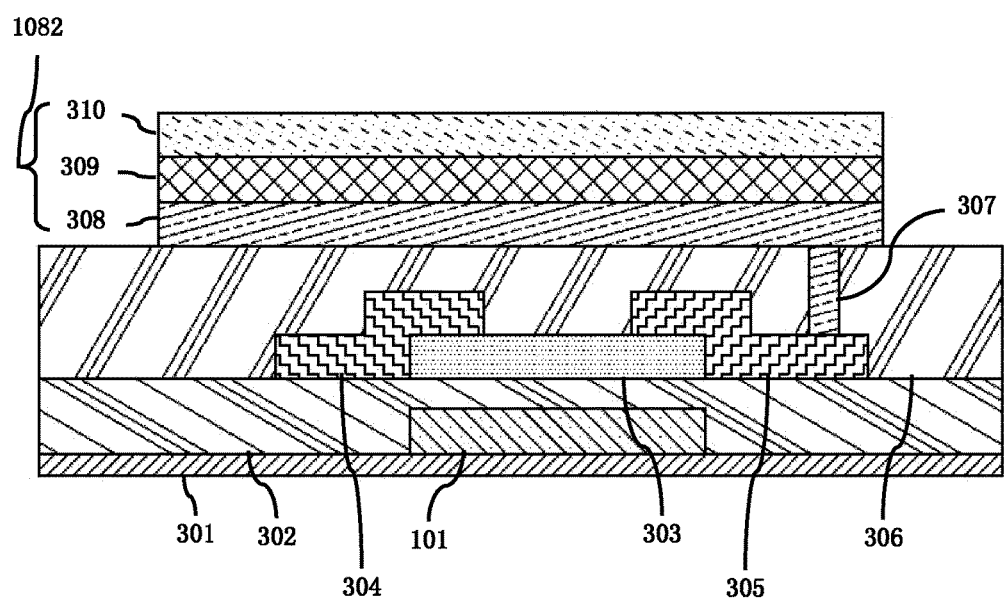
FIG. 3 is a cross-sectional view of the pressure detecting unit of the sensing panel according to the present invention.
Figure 4:
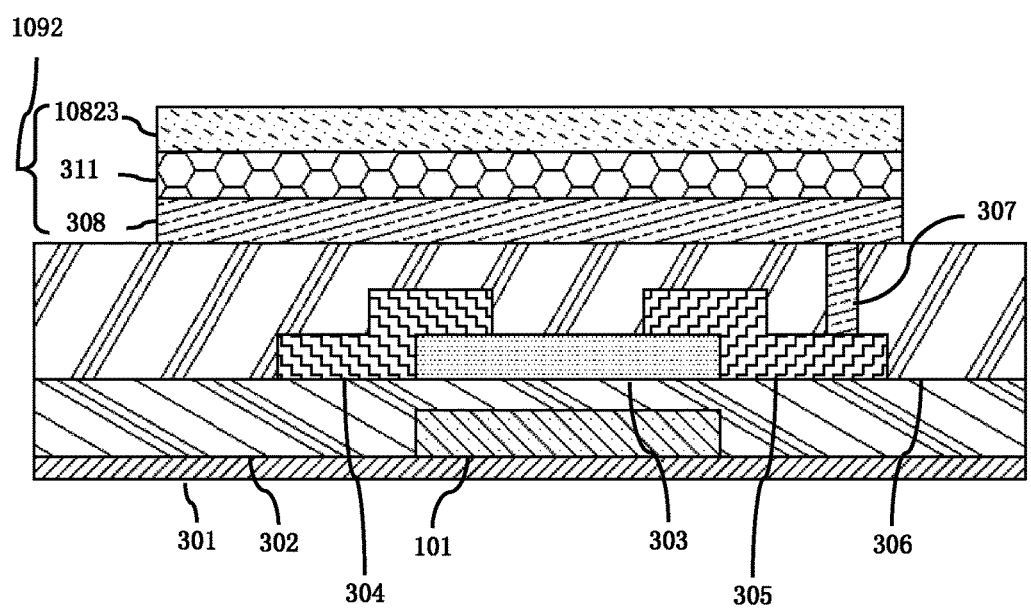
FIG. 4 is a cross-sectional view of the temperature detecting unit of the sensing panel according to the present invention.

FIG. 2 is an oscillogram of the scanning signal transmitted from the scanning line of FIG. 1;

Please refer to FIGS. 3 and 4. FIG. 3 is a cross-sectional view of the pressure detecting unit of the sensing panel according to the present invention. FIG. 4 is a cross-sectional view of the temperature detecting unit of the sensing panel according to the present invention.

In the embodiment, the sensing panel further comprises a substrate 301, a first insulation layer 302, a semi-conductor layer 303, a source electrode layer 304, a drain electrode layer 305, a second insulation layer 306, a first electrode layer 308, a dielectric layer, and a second electrode layer 310.

The scanning line 101 is disposed on the substrate 301. The first insulation layer 302 is disposed on the substrate 301, and the first insulation layer 302 covers the scanning line 101. The semi-conductor layer 303 is disposed on the first insulation layer 302. The source electrode layer 304 is disposed on the first insulation layer 302 and the semi-conductor layer 303. The drain electrode layer 305 is disposed on the first insulation layer 302 and the semi-conductor layer 303. The second insulation layer 306 is disposed on the first insulation layer 302, the semi-conductor layer 303, the source electrode layer 304, and the drain electrode layer 305. The first electrode layer 308 is disposed on the second insulation layer 306, the first electrode layer 308 connects with the drain electrode layer 305 through a via hole 307 of the second insulation layer 306. The dielectric layer is disposed on the first electrode layer 308. The second electrode layer 310 is disposed on the dielectric layer.

In the embodiment, in the pressure sensing unit 108, the dielectric layer comprises a rubber layer 309. In the temperature sensing unit 109, the dielectric layer comprises a thermal-sensitive metal layer 311; the thermal-sensitive metal layer 311 comprises thermal-sensitive metal, such as Platinum (Pt).

Meanwhile, the scanning line 101 is formed by spurting or evaporating a first metal layer on the substrate 301 and patterning the first metal layer. The first insulation layer 302 is formed by coating an insulation material on the substrate 301 and the scanning line 101. The semi-conductor layer 303 is formed by coating a semi-conductor material on the first insulation layer 302 and patterning the coated semi-conductor material. The source electrode layer 304 and the drain electrode layer 305 are formed by coating a second metal layer on the first insulation layer 302 and the semi-conductor layer 303 and patterning the second metal layer. The second insulation layer 306 is formed by coating an insulation material on the first insulation layer 302, the source electrode layer 304, the drain electrode layer 305, and the semi-conductor layer 303. The first electrode layer 308 is formed by spurting or evaporating a third metal layer on the second insulation layer 306 and patterning the third metal layer. The dielectric layer is formed by coating a dielectric material on the first electrode layer 308 and patterning the dielectric material. A second electrode layer 310 is formed by spurting or evaporating a fourth metal layer on the dielectric layer and patterning the fourth metal layer.

The sensing panel of the second embodiment is similar to the first embodiment above, with a difference is that:

In the embodiment, the first calculating circuit 110 further calculates a position where the pressure is applied, according to the pressure-detection signal and the scanning signal (G1, G2, G3) transmitted from the scanning line (101, 102, 103). Each adjacent two of the scanning lines (101, 102, 103) transmit the scanning signals (G1, G2, G3) at starting times that differ in a high level voltage duration as FIG. 2.

Or, the second calculating circuit 111 further calculates a position where the object either near or in contact with the temperature detecting unit 109, according to the temperature-detection signal and scanning signal (G1, G2, G3) transmitted from the scanning line (101, 102, 103).

The sensing panels of the first embodiment and the second embodiment are inflexible (unbendable); more specifically, the substrate 301 may be a glass substrate which is an inflexible substrate. The first insulation layer 302 and the second insulation layer 306 are both inflexible insulation layers, and the semi-conductor layer 303 is an inflexible semi-conductor layer.

However, the sensing panel can be flexible (bendable), the detail description is as follows:

The sensing panel of the third embodiment is similar to the above first embodiment and the second embodiment, with a difference is that:

The substrate 301 is a soft substrate, for example, the substrate 301 is a plastic substrate (including PET (Polyethylene Terephthalate) or PEN (Polyethylene Naphthalate). The first insulation layer 302 is a first organic insulation layer, the semi-conductor layer 303 is an organic semi-conductor layer, and the second insulation layer 306 is a second organic insulation layer.

The technical proposal mentioned above is able to accomplish a detection of a pressure (including strength and position) applied to the sensing panel and a detection of a temperature of an object either near or in contact with the sensing panel.

Figure 5:
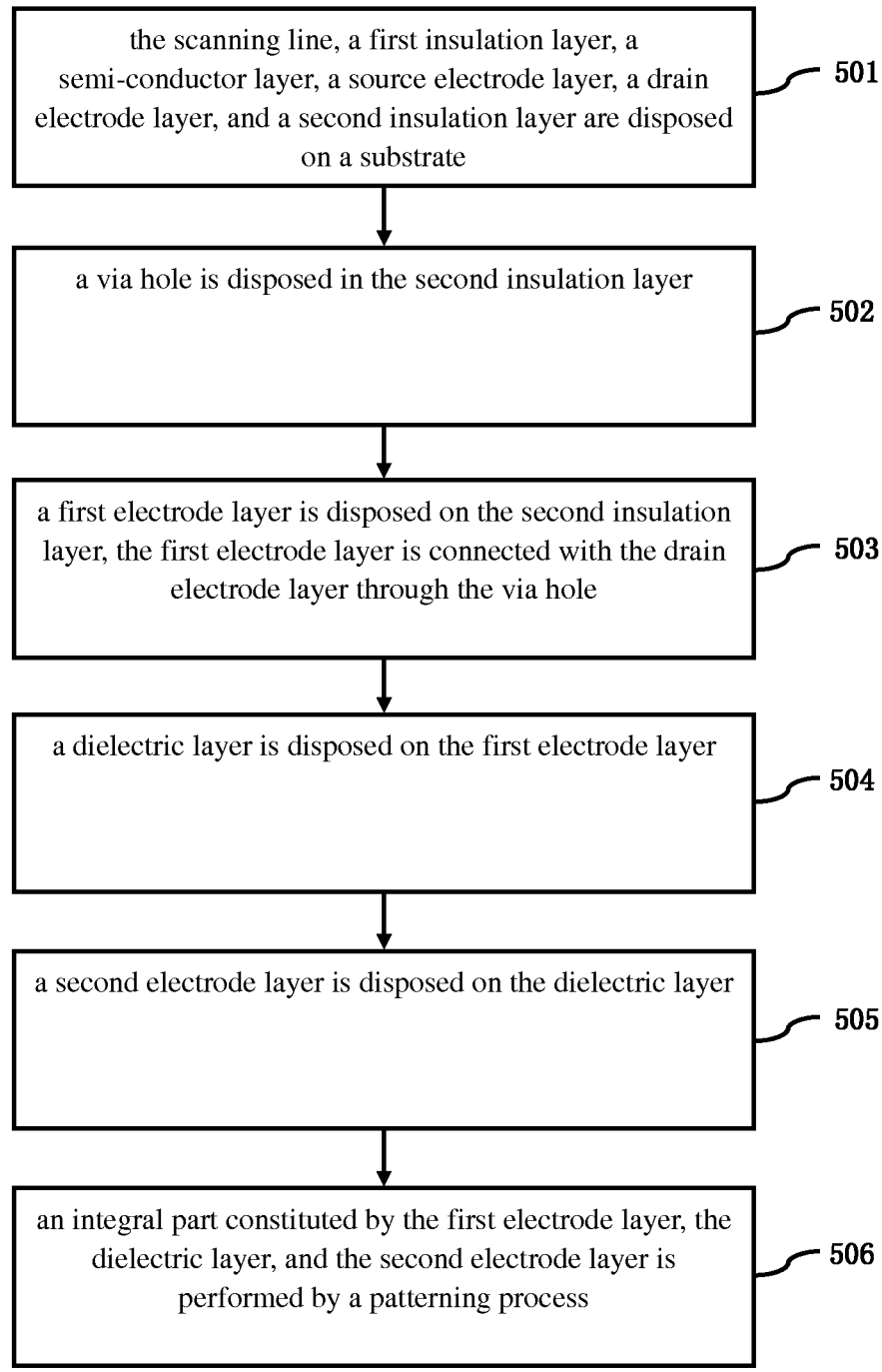
FIG. 5 is a flow diagram of the manufacturing method of first embodiment according to the present invention.

Please refer to FIG. 5, which is a flow diagram of the manufacturing method of first embodiment according to the present invention.

The manufacturing method of the sensing panel of the embodiment comprises the following steps:

A. (step 501) the scanning line 101, a first insulation layer 302, a semi-conductor layer 303, a source electrode layer 304, a drain electrode layer 305, and a second insulation layer 306 are disposed on a substrate. More specifically, the scanning line 101 is formed by spurting or evaporating a first metal layer on the substrate 301 and patterning the first metal layer. The first insulation layer 302 is formed by coating an insulation material on the substrate 301 and the scanning line 101. The semi-conductor layer 303 is formed by coating a semi-conductor material on the first insulation layer 302 and patterning the semi-conductor material. The source electrode layer 304 and the drain electrode layer 305 are formed by coating a second metal layer on the first insulation layer 302 and the semi-conductor layer 303 and patterning the second metal layer. The second insulation layer 306 is formed by coating an insulation material on the first insulation layer 302, the source electrode layer 304, the drain electrode layer 305, and the semi-conductor layer 303.

B. (step 502) a via hole 307 is disposed in the second insulation layer 306.

C. (step 503) a first electrode layer 308 is disposed on the second insulation layer 306, the first electrode layer 308 is connected with the drain electrode layer 305 through the via hole 307.

D. (step 504) a dielectric layer is disposed on the first electrode layer 308.

E. (step 505) a second electrode layer 310 is disposed on the dielectric layer.

F. (step 506) an integral part constituted by the first electrode layer 308, the dielectric layer, and the second electrode layer 310 is performed by a patterning process.

Figure 6:
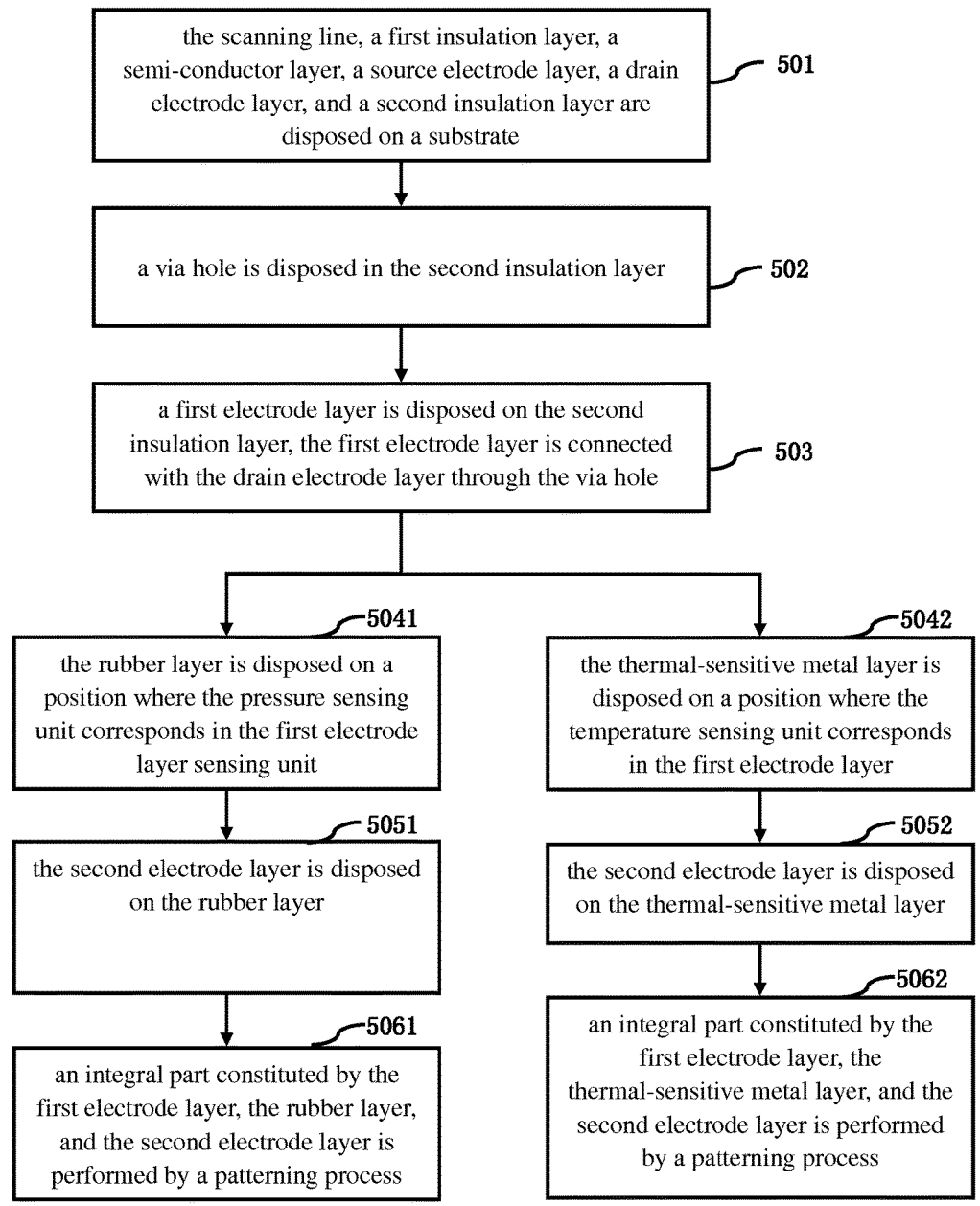
FIG. 6 is a flow diagram of the manufacturing method of second embodiment according to the present invention.

Please refer to FIG. 6, which is a flow diagram of the manufacturing method of second embodiment according to the present invention. The embodiment is similar to the first embodiment, the difference is:

In the embodiment, the dielectric layer comprises a rubber layer 309 and a thermal-sensitive metal layer 311. The rubber layer 309 is in the pressure sensing unit 108. The thermal-sensitive metal layer 311 is in the temperature sensing unit 109.

The step D (step 504) further comprises the following steps:

d1. (step 5041) the rubber layer 309 is disposed on a position where the pressure sensing unit 108 corresponds in the first electrode layer 308.

d2. (step 5042) the thermal-sensitive metal layer 311 is disposed on a position where the temperature sensing unit 109 corresponds in the first electrode layer 308.

The step F (step 505) further comprises following steps:

e1. (step 5051) the second electrode layer 310 is disposed on the rubber layer 309.

e2. (step 5052) the second electrode layer 310 is disposed on the thermal-sensitive metal layer 311.

The step F (step 506) further comprises following steps:

f1. (step 5061) an integral part constituted by the first electrode layer 308, the rubber layer 309, and the second electrode layer 310 is performed by a patterning process.

f2. (step 5062) an integral part constituted by the first electrode layer 308, the thermal-sensitive metal layer 311, and the second electrode layer 310 is performed by a patterning process.

In the embodiment, the step C, the step D, the step E, and the step F are able to proceed by the following method:

a third metal layer is spurted or evaporated on the second insulation layer 306 and the third metal layer is patterned to form a first electrode layer 308. A dielectric material is coated on the first electrode layer 308 and the dielectric material is patterned to form the dielectric layer. A fourth metal layer is spurted or evaporated on the dielectric layer and the fourth metal layer is patterned to form a second electrode layer.

Figure 7:
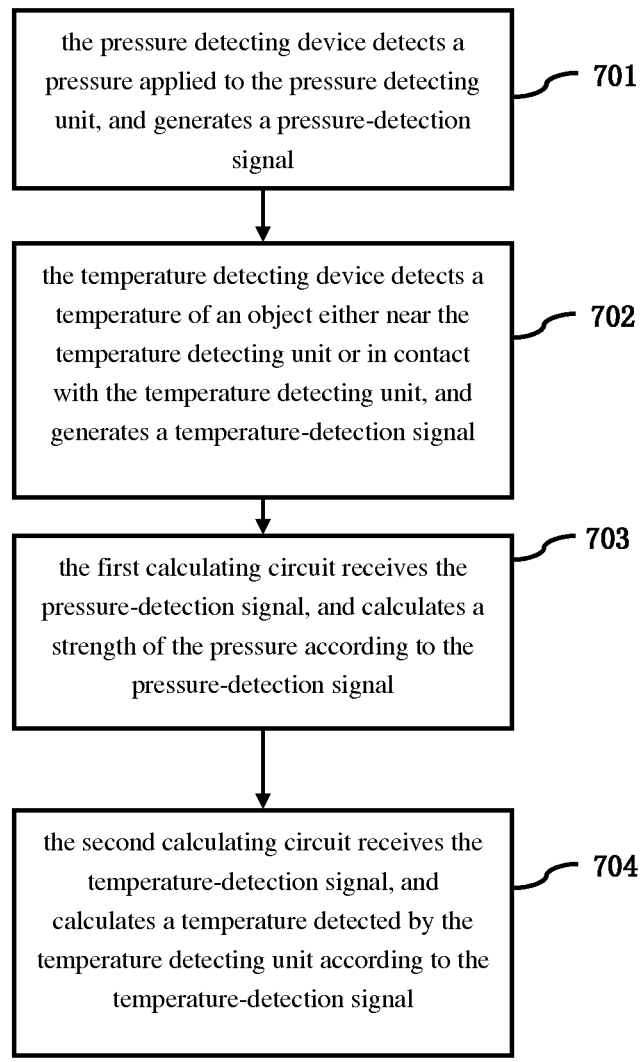
FIG. 7 is a flow diagram of a method for pressure detection and temperature detection of first embodiment according to the present invention.

Please refer to FIG. 7, which is a flow diagram of a method for pressure detection and temperature detection of first embodiment according to the present invention.

The method for pressure detection and temperature detection of the sensing panel of the embodiment comprises following steps:

G. (step 701) the pressure detecting device 1082 detects a pressure applied to the pressure detecting unit 108, and generates a pressure-detection signal.

H. (step 702) the temperature detecting device 1092 detects a temperature of an object either near the temperature detecting unit 109 or in contact with the temperature detecting unit 109, and generates a temperature-detection signal.

I. (step 703) the first calculating circuit 110 receives the pressure-detection signal, and calculates a strength of the pressure according to the pressure-detection signal.

J. (step 704) the second calculating circuit 111 receives the temperature-detection signal, and calculates a temperature detected by the temperature detecting unit 109 according to the temperature-detection signal.

Figure 8:
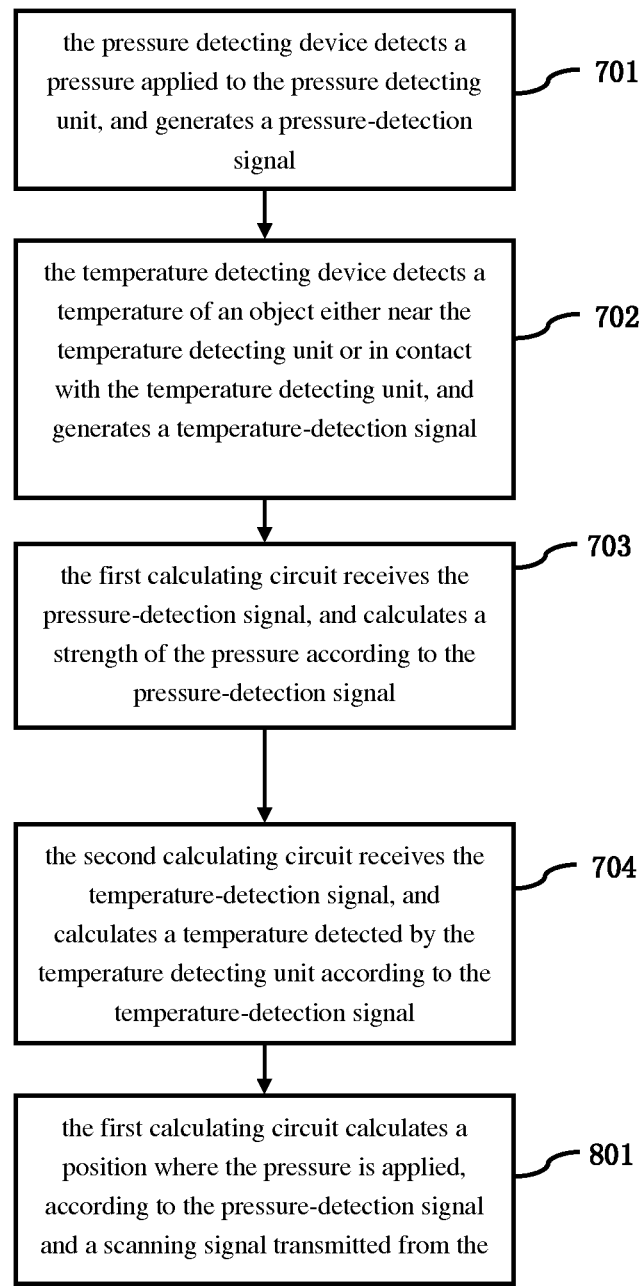
FIG. 8 is a flow diagram of a method for pressure detection and temperature detection of second embodiment according to the present invention.

Please refer to FIG. 8, which is a flow diagram of a method for pressure detection and temperature detection of second embodiment according to the present invention. The embodiment is similar to the first embodiment, the difference is:

In the embodiment, the method further comprises the following steps:

K. (step 801) the first calculating circuit 110 calculates a position where the pressure is applied, according to the pressure-detection signal and a scanning signal (G1, G2, G3) transmitted from the scanning line (101, 102, 103).

Figure 9:
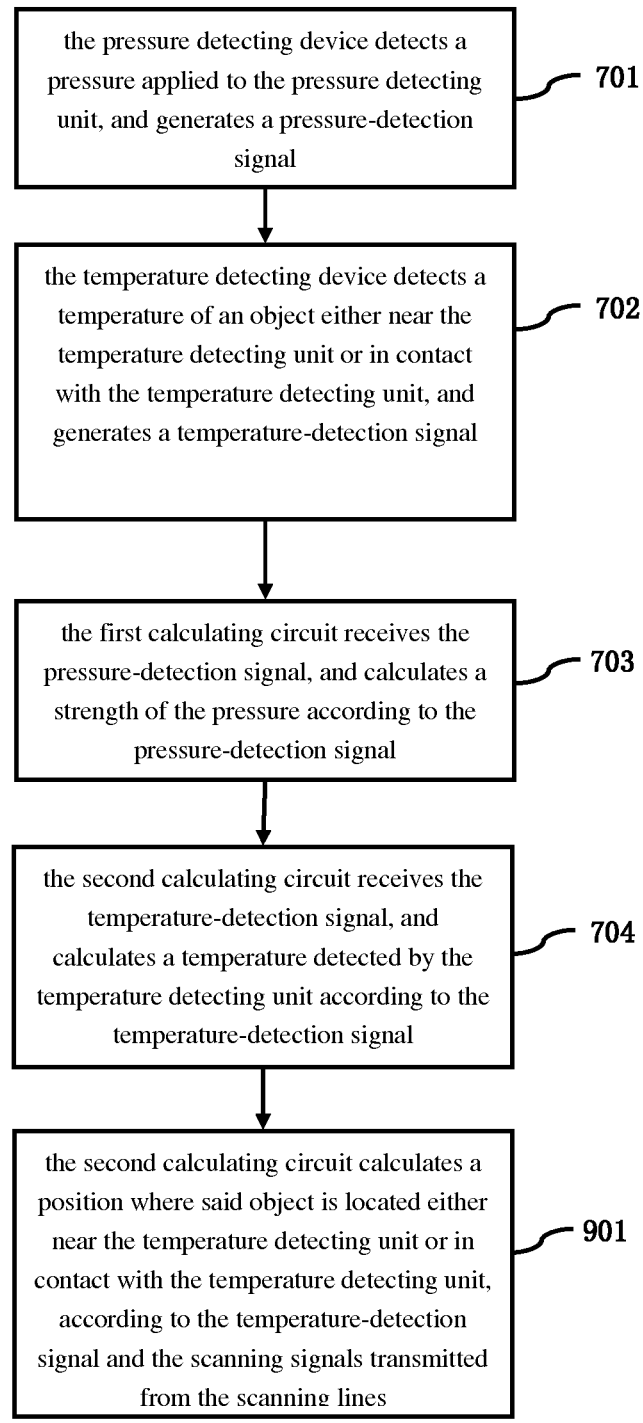
FIG. 9 is a flow diagram of a method for pressure detection and temperature detection of third embodiment according to the present invention.

Please refer to FIG. 9, which is a flow diagram of a method for pressure detection and temperature detection of third embodiment according to the present invention. The embodiment is similar to the first embodiment, the difference is:

In the embodiment, the method further comprises following steps:

L. (step 901) the second calculating circuit 111 calculates a position where said object is located either near the temperature detecting unit 109 or in contact with the temperature detecting unit 109, according to the temperature-detection signal and the scanning signals (G1, G2, G3) transmitted from the scanning lines (101, 102, 103).

The technical proposal mentioned above is able to accomplish a detection of a pressure (including strength and position) applied to the sensing panel and a detection of a temperature of an object either near the sensing panel or in contact with the sensing panel.

Despite one or more preferred embodiments of the present invention having been illustrated and described, those having ordinary skills in the art may easily contemplate equivalent changes and modifications according to the disclosure and drawings of the present invention. All such modifications and variations are considered to be encompassed in the scope defined by the claims of the present invention. Particularly with regard to the various functions performed by the above-described components, the terms used to describe such components are intended to perform the specified function corresponding to the component, which may be performed by any other components (functionally equivalent unless otherwise indicated), even though other components are not the same in the structure as shown in the exemplary implementations of this specification. Furthermore, although a particular feature relating to a number of embodiments has been disclosed in this specification, this feature may be combined with one or more other features to have other embodiments which are desirable and advantageous to a given or particular application. Moreover, the terms "including", "having", "containing" or variations thereof are used in the detailed description or the claims with a meaning similar to the term "comprising".

In summary, while the present invention has been described with the aforementioned preferred embodiments, it is preferable that the descriptions relating to the above embodiments should be construed as exemplary rather than as limiting of the present invention. One of ordinary skill in the art can make a variety of modifications and variations without departing from the spirit and scope of the present invention as defined by the following claims.

What is claimed is:

1. A sensing panel, wherein the sensing panel comprises:
   scanning lines;
   data line combinations, each data line combination comprising a first data line and a second data line;
   signal-detection line combinations, each signal-detection line combination comprising a first detection line and a second detection line;
   detecting unit combinations, wherein each detecting unit combination is connected with one of the scanning lines, one of the data line combinations, and one of the signal-detection line combinations, wherein each of the detecting unit combinations comprises:
      a pressure detecting unit, which comprises a first thin film transistor switch and a pressure detecting device, the first thin film transistor switch being connected with the scanning line, the first data line and the pressure detecting device, the pressure detecting device further being connected with the first detection line and the pressure detecting device being used to detect a pressure applied to the pressure detecting unit, to generate a pressure-detection signal; and
      a temperature detecting unit, which comprises a second thin film transistor switch and a temperature detecting device, the second thin film transistor switch being connected with the scanning line, the second data line and the temperature detecting device, the temperature detecting device further being connected with the second detection line, the temperature detecting device being used to detect a temperature of an object either near the temperature detecting unit or in contact with the temperature detecting unit, to generate a temperature-detection signal;
   wherein the sensing panel further comprises:
   a first calculating circuit, which connects with the first detection line, the first calculating circuit being used to receive the pressure-detection signal and to calculate a strength of the pressure according to the pressure-detection signal; and
   a second calculating circuit, which connects with the second detection line, the second calculating circuit being used to receive the temperature-detection signal and to calculate the temperature detected by the temperature detecting unit according to the temperature-detection signal;
   wherein the first calculating circuit further calculates a position where the pressure is applied, according to the pressure-detection signal and a scanning signal transmitted from the scanning line, or the second calculating circuit further calculates a position where the object is located either near the temperature detecting unit or in contact with the temperature detecting unit, according to the temperature-detection signal and a scanning signal transmitted from the scanning line;
   wherein adjacent two of the scanning lines transmit the scanning signals at starting times that differ in a high level voltage duration.

2. The sensing panel according to claim 1, wherein the first thin film transistor switch comprises a first gate electrode, a first source electrode and a first drain electrode, the first gate electrode connects with the scanning line, the first source electrode connects with the first data line, the first drain electrode connects with a terminal of the pressure sensing device, another terminal of the pressure sensing device connects with the first detection line;
   the second thin film transistor switch comprises a second gate electrode, a second source electrode and a second drain electrode, the second gate electrode connects with the scanning line, the second source electrode connects with the second data line, the second drain electrode connects with a terminal of the temperature sensing device, another terminal of the temperature sensing device connects with the second detection line.

3. The sensing panel according to claim 1, wherein the sensing panel further comprises:
   a substrate, the scanning line being disposed on the substrate;
   a first insulation layer, disposed on the substrate, and the first insulation layer covers the scanning line;
   a semi-conductor layer, disposed on the first insulation layer;
   a source electrode layer, disposed on the first insulation layer and the semi-conductor layer;
   a drain electrode layer, disposed on the first insulation layer and the semi-conductor layer;
   a second insulation layer, disposed on the first insulation layer, the semi-conductor layer, the source electrode layer and the drain electrode layer;
   a first electrode layer, disposed on the second insulation layer, the first electrode layer being connected with the drain electrode layer through a via hole of the second insulation layer;
   a dielectric layer, disposed on the first electrode layer; and
   a second electrode layer, disposed on the dielectric layer.

4. The sensing panel according to claim 3, wherein in the pressure sensing unit, the dielectric layer comprises a rubber layer; in the temperature sensing unit, the dielectric layer comprises a thermal-sensitive metal layer.

5. The sensing panel according to claim 3, wherein the substrate is a plastic substrate, the first insulation layer is a first organic insulation layer, the semi-conductor layer is an organic semi-conductor layer, and the second insulation layer is a second organic insulation layer.

6. A sensing panel, wherein the sensing panel comprises:
   at least one scanning line;
   at least one data line combination, which comprises a first data line and a second data line;
   at least one signal-detection line combination, which comprises a first detection line and a second detection line;
   at least one detecting unit combination, wherein the detecting unit combination is connected with the scanning line, the data line combination, and the signal-detection line combination, the detecting unit combination comprises:
      a pressure detecting unit, which comprises a first thin film transistor switch and a pressure detecting device, the first thin film transistor switch being connected with the scanning line, the first data line, and the pressure detecting device, the pressure detecting device further being connected with the first detection line and the pressure detecting device being used to detect a pressure applied to the pressure detecting unit, to generate a pressure-detection signal; and a temperature detecting unit, which comprises a second thin film transistor switch and a temperature detecting device, the second thin film transistor switch being connected with the scanning line, the second data line, and the temperature detecting device, the temperature detecting device further being connected with the second detection line, the temperature detecting device being used to detect a temperature of an object either near the temperature detecting unit or in contact with the temperature detecting unit, to generate a temperature-detection signal.

7. The sensing panel according to claim 6, wherein the sensing panel further comprises:

a first calculating circuit, which connects with the first detection line, the first calculating circuit being used to receive the pressure-detection signal and to calculate a strength of the pressure according to the pressure-detection signal; and a second calculating circuit, which connects with the second detection line, the second calculating circuit being used to receive the temperature-detection signal and to calculate the temperature detected by the temperature detecting unit according to the temperature-detection signal.

8. The sensing panel according to claim 7, wherein the first calculating circuit further calculates a position where the pressure is applied, according to the pressure-detection signal and a scanning signal transmitted from the scanning line, or the second calculating circuit further calculates a position where the object is located either near the temperature detecting unit or in contact with the temperature detecting unit, according to the temperature-detection signal and a scanning signal transmitted from the scanning line.

9. The sensing panel according to claim 8, wherein the at least one scanning line comprises plural scanning lines, and adjacent two of the scanning lines transmit the scanning signals at starting times that differ in a high level voltage duration.

10. A method for pressure detection and temperature detection of the sensing panel according to claim 7, wherein the method comprises following steps:

G. the pressure detecting device detecting a pressure applied to the pressure detecting unit, and generating a pressure-detection signal;

H. the temperature detecting device detecting a temperature of an object either near the temperature detecting unit or in contact with the temperature detecting unit, and generating a temperature-detection signal;

I. the first calculating circuit receiving the pressure-detection signal and calculating a strength of the pressure according to the pressure-detection signal;

J. the second calculating circuit receiving the temperature-detection signal and calculating a temperature detected by the temperature detecting unit, according to the temperature-detection signal.

11. The method for pressure detection and temperature detection of the sensing panel according to claim 10, wherein the method further comprises:

K. the first calculating circuit calculating a position where the pressure is applied, according to the pressure-detection signal and a scanning signal transmitted from the scanning line;

L. the second calculating circuit calculating a position where said object is located either near the temperature detecting unit or in contact with the temperature detecting unit, according to the temperature-detection signal and the scanning signal transmitted from the scanning line.

12. The method for pressure detection and temperature detection of the sensing panel according to claim 10, wherein the at least one scanning line comprises plural scanning lines, and adjacent two of the scanning lines transmit the scanning signals at starting times that differ in a high level voltage duration.

13. The sensing panel according to claim 6, wherein the first thin film transistor switch comprises a first gate electrode, a first source electrode, and a first drain electrode, the first gate electrode connects with the scanning line, the first source electrode connects with the first data line, the first drain electrode connects with a terminal of the pressure sensing device, another terminal of the pressure sensing device connects with the first detection line;

the second thin film transistor switch comprises a second gate electrode, a second source electrode, and a second drain electrode, the second gate electrode connects with the scanning line, the second source electrode connects with the second data line, the second drain electrode connects with a terminal of the temperature sensing device, another terminal of the temperature sensing device connects with the second detection line.

14. The sensing panel according to claim 6, wherein the sensing panel further comprises:

a substrate, the scanning line being disposed on the substrate;

a first insulation layer, disposed on the substrate, and the first insulation layer covers the scanning line;

a semi-conductor layer, disposed on the first insulation layer;

a source electrode layer, disposed on the first insulation layer and the semi-conductor layer;

a drain electrode layer, disposed on the first insulation layer and the semi-conductor layer;

a second insulation layer, disposed on the first insulation layer, the semi-conductor layer, the source electrode layer, and the drain electrode layer;

a first electrode layer, disposed on the second insulation layer, the first electrode layer being connected with the drain electrode layer through a via hole of the second insulation layer;

a dielectric layer, disposed on the first electrode layer; and a second electrode layer, disposed on the dielectric layer.

15. The sensing panel according to claim 14, wherein in the pressure sensing unit, the dielectric layer comprises a rubber layer; in the temperature sensing unit, the dielectric layer comprises a thermal-sensitive metal layer.

16. The sensing panel according to claim 14, wherein the substrate is a plastic substrate, the first insulation layer is a first organic insulation layer, the semi-conductor layer is an organic semi-conductor layer, and the second insulation layer is a second organic insulation layer.

17. A manufacturing method of the sensing panel according to claim 6, wherein the manufacturing method comprises:

A. disposing the scanning line, a first insulation layer, a semi-conductor layer, a source electrode layer, a drain electrode layer, and a second insulation layer on a substrate;

B. disposing a via hole in the second insulation layer;

C. disposing a first electrode layer on the second insulation layer, the first electrode layer being connected with the drain electrode layer through the via hole;
D. disposing a dielectric layer on the first electrode layer;
E. disposing a second electrode layer on the dielectric layer;
F. performing a patterning process on an integral part constituted by the first electrode layer, the dielectric layer, and the second electrode layer.

18. The manufacturing method according to claim 17, wherein the dielectric layer comprises a rubber layer and a thermal-sensitive metal layer, the rubber layer is in the pressure sensing unit, the thermal-sensitive metal layer is in the temperature sensing unit;

the step D further comprises following steps:
d1. disposing the rubber layer on a position where the pressure sensing unit corresponds in the first electrode layer;
d2. disposing the thermal-sensitive metal layer on a position where the temperature sensing unit corresponds in the first electrode layer;

the step F further comprises following steps:
f1. performing a patterning process on an integral part constituted by the first electrode layer, the rubber layer, and the second electrode layer;
f2. performing a patterning process on an integral part constituted by the first electrode layer, the thermal-sensitive metal layer, and the second electrode layer.

19. A manufacturing method of the sensing panel according to claim 6, wherein the manufacturing method comprises:
M. disposing the scanning line, a first insulation layer, a semi-conductor layer, a source electrode layer, a drain electrode layer, and a second insulation layer on a substrate;
N. disposing a via hole in the second insulation layer;
O. spurting or evaporating a metal layer on the second insulation layer, and patterning the metal layer on the second insulation layer to form a first electrode layer;
P. coating a dielectric material on the first electrode layer, and patterning the dielectric material to form the dielectric layer;
Q. spurting or evaporating a fourth metal layer on the dielectric layer, and patterning the metal layer on the dielectric layer to form a second electrode layer.

20. The manufacturing method according to claim 19, wherein the dielectric layer comprises a rubber layer and a thermal-sensitive metal layer, the rubber layer is in the pressure sensing unit, the thermal-sensitive metal layer is in the temperature sensing unit;

the step P further comprises following steps:
p1. disposing the rubber layer on a position where the pressure sensing unit corresponds in the first electrode layer;
p2. disposing the thermal-sensitive metal layer on a position where the temperature sensing unit corresponds in the first electrode layer.

* * * * *